United States Patent
Lindskog et al.

(10) Patent No.: US 12,519,662 B2
(45) Date of Patent: Jan. 6, 2026

(54) SYSTEMS AND METHODS FOR PUF SLICING

(71) Applicant: TELEFONAKTIEBOLAGET LM ERICSSON (PUBL), Stockholm (SE)

(72) Inventors: Niklas Lindskog, Lund (SE); Håkan Englund, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 147 days.

(21) Appl. No.: 18/288,007

(22) PCT Filed: Apr. 23, 2021

(86) PCT No.: PCT/IB2021/053388
§ 371 (c)(1),
(2) Date: Oct. 23, 2023

(87) PCT Pub. No.: WO2022/224023
PCT Pub. Date: Oct. 27, 2022

(65) Prior Publication Data
US 2024/0333535 A1    Oct. 3, 2024

(51) Int. Cl.
*H04L 9/32*    (2006.01)
*H04L 9/06*    (2006.01)

(52) U.S. Cl.
CPC .......... *H04L 9/3278* (2013.01); *H04L 9/0662* (2013.01)

(58) Field of Classification Search
CPC ..... H04L 9/3278; H04L 9/0662; H04L 9/085; H04L 9/0866
See application file for complete search history.

(56) References Cited

U.S. PATENT DOCUMENTS

| 8,639,949 B2 | 1/2014 | Van Rijnswou |
| 9,558,358 B2 | 1/2017 | Aissi et al. |

(Continued)

FOREIGN PATENT DOCUMENTS

| EP | 3410633 A1 | 12/2018 |
| WO | 2018141378 A1 | 8/2018 |

(Continued)

OTHER PUBLICATIONS

Gao et al., "Obfuscated Challenge-Response: A Secure Lightweight Authentication Mechanism for PUF-Based Pervasive Devices", The First IEEE International Workshop on Security, Privacy and Trust for IoT, (Year: 2016).*

(Continued)

*Primary Examiner* — Morshed Mehedi
(74) *Attorney, Agent, or Firm* — Sage Patent Group

(57) ABSTRACT

Systems and methods are disclosed herein for implementing a secure hardware component by dividing a single Physically Unclonable Function (PUF) into several PUF challenge space subsets and mapping each subset to each requesting entity. In one example of the secure hardware component, the controller divides a challenge space of the PUF into multiple challenge space subsets and performs a mapping of allowed requesting entities to the plurality of challenge space subsets, respectively. The secure hardware component receives a request for an output from the requesting entity, which comprises a set of parameters. The controller determines whether the request is a valid request based on the set of parameters and forwards the challenge to the response generation subsystem. The response generation subsystem generates the output based on the challenge and forwards it to the requesting entity.

32 Claims, 9 Drawing Sheets

(56) References Cited

U.S. PATENT DOCUMENTS

| | | | |
|---|---|---|---|
| 2016/0269186 A1* | 9/2016 | Wallrabenstein | H04L 9/3278 |
| 2016/0328571 A1 | 11/2016 | Duplys et al. | |
| 2017/0149572 A1* | 5/2017 | Wallrabenstein | ............................ H03K 19/17748 |
| 2017/0346644 A1 | 11/2017 | Cambou | |
| 2018/0152306 A1* | 5/2018 | Lu | H04L 9/3278 |
| 2018/0287806 A1* | 10/2018 | Carboni | H04W 12/06 |
| 2018/0351752 A1* | 12/2018 | Wallrabenstein | H04L 9/002 |
| 2020/0186339 A1 | 6/2020 | Hung et al. | |

FOREIGN PATENT DOCUMENTS

| | | |
|---|---|---|
| WO | 2021259500 A1 | 12/2021 |
| WO | 2021259501 A1 | 12/2021 |

OTHER PUBLICATIONS

Gu et al., "A Modeling Attack Resistant Deception Technique for Securing Lightweight-PUF-Based Authentication", IEEE Transactions on Computer-Aided Design of Integrated Circuits and Systems, vol. 40, Date of Publication: (Year: Nov. 10, 2020).*
Frisch et al., "PAG-IoT: A PUF and AEAD Enabled Trusted Hardware Gateway for IoT Devices", 2020 IEEE Computer Society Annual Symposium on VLSI, 2020, pp. 500-505.
Katzenbeisser, et al, "Recyclable PUFs: Logically Reconfigurable PUFs", Journal of Cryptographic Engineering, Issue 23, 2011.
Usmani et al., "Efficient PUF-Based Key Generation in FPGAs Using Per-Device Configuration", IEEE Transactions on Very Large Scale Integration (VLSI) system, Feb. 2019, pp. 364-375, vol. 27, No. 2, IEEE service.

* cited by examiner

SYSTEMS AND METHODS FOR PUF SLICING

PRIORITY CLAIM

This application is a national stage application of International Patent Application No. PCT/IB2021/053388, filed Apr. 23, 2021, the disclosure disclosures of which is hereby incorporated in its entirety by reference.

TECHNICAL FIELD

The present disclosure relates to secure hardware for electronically securing electronic devices using security keys generated by Physically Unclonable Functions (PUFs).

BACKGROUND

Physically Unclonable Functions (PUFs) are circuits, components, processes, or other entities capable of generating an output, such as a key, a digital identity, or an authentication token. A PUF should be resistant to cloning, for example, a device that has a PUF would be difficult to clone to generate the same output of the PUF with another device.

Physically Unclonable Functions (PUFs)

PUFs are used to create a unique response by using implicit or explicit randomness. This response can be used for cryptographic or device identity purposes. Implicit randomness may include unpredictable manufacturing differences in semiconductor devices that can be exploited to create a device-unique response. On the other hand, explicit randomness means that the introduction of randomness requires extra steps during manufacturing or a later stage, e.g., at packaging.

A PUF comprises one or several subfunctions, sometimes called elements or components, each of which contributes a part of the PUF response. One example of the subfunctions of a PUF may be a ring-oscillator pair. A ring oscillator is formed by an uneven number of signal inverters in a ring, where gate delay propagation is used as a randomness source. The PUF response is based on a comparison between two or more ring-oscillators where the number of oscillations at a given point is measured. In particular, the PUF response may be an identifier of the fastest ring oscillator or the slowest ring oscillator. Another example of the subfunctions of a PUF may be uninitialized Static Random Access Memory (SRAM) cells, which have two possible states (0 and 1). Prior to power-up, an SRAM cell is in neither state. At power-up, the SRAM cell stabilizes in one of the two states. The PUF response is the entered state of a set of SRAM cells. Yet another example is an arbiter. An arbiter might be regarded as a digital race condition between two or more signal paths on a chip where a so-called arbiter circuit identifies the winning signal. The paths might comprise several switch blocks, which can alter the signal paths. In this case, the PUF response can be an Identification (ID) of the winning signal. In some PUF entities, the same subfunction(s) might generate several outputs by utilizing different parts of a PUF challenge. Each subfunction also has the property that it is physically unclonable, i.e., unique for the device. A PUF may therefore comprise several subfunctions which can be used as independent PUFs, albeit with fewer possible challenges and fewer response bits.

The PUF response can be used to create a unique device identity or a device-unique key, without having to store the key in, e.g., Battery Backup Random Access Memory (BBRAM) or One Time Programmable (OTP) memory. Hence, it is much harder for an attacker to mount certain types of hardware attacks with the goal of recovering the key from a device using a PUF.

There are several types of PUFs, but all PUFs accept a challenge as input. The PUFs generally translate the challenge into either (i) a selection of at least one element within the PUF or (ii) a configuration of at least one element within the PUF. Depending on what type of PUF is used, the number of challenges that are accepted by the PUF can vary from just one to an exponential amount related to the number of subfunctions. In the present disclosure, the challenge is considered to be an input to the PUF that creates a specified number of response bits. The present disclosure may include activating the PUF several times using different subsections of the challenge wherein each of the different subsections generates at least one part of the response.

Most PUF types additionally require helper data to function properly to increase the possibility of recreating the same response given the same challenge. Some PUF types can remap the challenge-response mapping one or several times. After the remapping, some or all challenges may result in new responses. A reconfigurable PUF can alter the entire challenge space, e.g., to make sure that all challenges receive a new response. An erasable PUF is a PUF that has the possibility to change responses of specific challenges. Alternatively, the PUF might respond with a null sequence, for example, all zeros, for challenges marked as "erased." When a PUF response (or a derivation thereof) is used to encrypt another cryptographic key, the PUF response is called Key Encryption Key (KEK).

RELATED ART

U.S. Pat. No. 9,558,358, titled "Random number generator in a virtualized environment" (hereinafter "Aissi"), describes a solution where several different entropy sources are used to create a Random Number Generator (RNG) or a PUF for a virtual machine. The entropy is evaluated during runtime. Aissi focuses primarily on generating randomness but mentions the possibility of using the entropy sources as a PUF. Aissi describes a PUF as something that can be created from repeatable randomness rather than using a dedicated construction of a PUF.

U.S. Pat. No. 8,639,949, titled "Device with a secure virtual machine," (hereinafter "Rijnswou") describes a virtual machine manager that uses a PUF to generate keys for different virtual machines. The challenge to the PUF and thereby the key depends on the identifier of the virtual machine. The identifier may depend on a state or a computer program running on the virtual machine.

A paper titled "Recyclable PUFs: Logically Reconfigurable PUFs," (International Association for Cryptologic Research (IACR), International Workshop on Cryptographic Hardware and Embedded Systems, CHES 2011) (hereinafter "IACR paper") describes a PUF that has a randomly generated and updatable state. The state enables a unique Challenge-Response Pair (CRP) mapping.

U.S. Patent Application Publication No. 2016/0328571, titled "Method for executing a safety-critical function of a computing unit in a cyber-physical system" (hereinafter "Duplys"), describes a device where the PUF is not activated unless a particular environmental circumstance and/or user-supplied credential is fulfilled.

SUMMARY

Systems and methods are disclosed herein for enabling a single Physically Unclonable Function (PUF) to be divided into several PUF slices. Each PUF slice can only be accessed by a specific entity, such as a virtual machine, a hardware component, a computer program, or a device. In one embodiment, each PUF slice corresponds to a different subset of a challenge space of the PUF. In another embodiment, each PUF slice corresponds to a different transformed set of challenge-response pairs for the PUF. By giving each requesting entity the ability to produce several unique PUF responses and thereby cryptographic keys, the systems and methods of the present disclosure provide implementation-wise cheap protection against cross-context attacks that try to expose data belonging to another component, such as a virtual machine, a container, a computer program, or a computer device.

In one embodiment, a secure hardware component comprises a controller configured to exchange data with a requesting entity and a response generation subsystem coupled to the controller and where the response generation subsystem includes a PUF. The controller is configured to divide a challenge space of the PUF into a plurality of challenge space subsets and map one or more allowed requesting entities to one or more of the plurality of challenge space subsets, respectively. The controller is further configured to receive a request for an output from a requesting entity from among the one or more allowed requesting entities. The request comprises a set of parameters. The controller is further configured to determine whether the request is a valid request based on the set of parameters and forward the challenge to the response generation subsystem responsive to determining that the request is a valid request. The response generation subsystem is configured to generate the output based on the challenge and forward the output to the requesting entity via the controller.

In one embodiment, the set of parameters comprised in the request comprises the challenge. In one embodiment, the set of parameters comprised in the request comprises a first part of the challenge, and the controller is further configured to combine the first part of the challenge with a stored second part of the challenge to provide the challenge. In one embodiment, the set of parameters comprised in the request comprises an input to a challenge creation function which is used to create a challenge for the PUF. In one embodiment, the challenge creation function comprises a Lookup Table (LUT). In one embodiment, the challenge creation function comprises a One-way Function (OWF). In one embodiment, the challenge creation function comprises a Pseudo-Random Number Generator (PRNG). In one embodiment, the controller is further configured to save helper data utilized by the response generation subsystem to generate the output. In one embodiment, in order to determine whether the request is a valid request, the controller is further configured to check whether the challenge is included in one of the plurality of challenge space subsets that is mapped to the requesting entity from which the request is received.

In one embodiment, in order to generate the output, the response generation subsystem is further configured to receive the challenge from the controller, obtain a response provided by the PUF responsive to the challenge, and generate the output based on the response provided by the PUF responsive to the challenge. In one embodiment, the response generation subsystem is further configured to perform an error correction on the response by the PUF to provide an error-corrected response, and generate the output based on the error-corrected response.

In one embodiment, in order to generate the output based on the error-corrected response, the response generation subsystem is further configured to apply a One-Way Function (OWF) or Key Derivation Function (KDF) to the error-corrected response to provide the output.

In one embodiment, the controller is configured to save helper data utilized by the response generation subsystem to generate the output. The helper data comprises an error correction code used to provide the error-corrected response.

In one embodiment, in order to generate the output based on the response provided by the PUF responsive to the challenge, the response generation subsystem is further configured to apply an OWF or a KDF to the response provided by the PUF to provide the output.

In one embodiment, the set of parameters further comprises a credential related to the requesting entity from which the request is received. In one embodiment, in order to determine whether the request is a valid request, the controller is further configured to check whether the credential comprised in the request fulfills an authorization criterion at the secure hardware component. In one embodiment, the credential comprises: (a) a predefined token, (b) an identity of the requesting entity, (c) a state of the requesting entity, (d) a proof of possession of a secret, (e) a password, (f) a Personal Identification Number (PIN), (g) biometric input, (h) attributes related to the requesting entity or (i) a combination of any two or more of (a)-(h).

In one embodiment, in order to generate the output, the response generation subsystem is further configured to receive the challenge from the controller, obtain a response provided by the PUF responsive to the challenge, and generate the output based on the response provided by the PUF responsive to the challenge and additional data using a transformation function. In order to generate the output based on the response provided by the PUF responsive to the challenge and the additional data using the transformation function, the response generation subsystem is further configured to perform an error correction on the response by the PUF to provide an error-corrected response, and generate the output based on the error-corrected response and the additional data using the transformation function. In one embodiment, the additional data comprises (a) a credential, (b) data stored on the secure hardware component, (c) data received from the requesting entity, or (d) two or more of (a)-(c). In one embodiment, the transformation function comprises an OWF. In one embodiment, the transformation function comprises a KDF.

In one embodiment, the challenge corresponds to a selection of at least one element in the PUF to generate at least one response that is a result of the selection, and the output is based on the at least one response generated by the PUF as a result of the selection. In one embodiment, the challenge corresponds to a configuration of at least one element of the PUF, and the output is based on at least one response generated by the PUF as a result of the configuration.

In one embodiment, a first response corresponding to at least one challenge from the challenge space of the PUF is disallowed from being generated. In one embodiment, the at least one challenge is removed from the plurality of challenge space subsets. In one embodiment, the first response corresponding to the at least one challenge is replaced with a second response.

Corresponding embodiments of a method implemented in a secure hardware component are also disclosed. In one embodiment, a method implemented in a secure hardware component includes a controller configured to exchange data with a requesting and a response generation subsystem coupled to the controller and including a PUF. The method comprises, at the controller, dividing a challenge space of the PUF into a plurality of challenge space subsets, mapping one or more allowed requesting entities to one or more of the plurality of challenge space subsets, respectively, receiving a request for an output from a requesting entity among the one or more allowed requesting entities. The request comprises a set of parameters. The method further comprises, at the controller, determining whether the request is a valid request based on the set of parameters and forwarding the challenge to the response generation subsystem responsive to determining that the request is a valid request. The method further comprises, at the response generation subsystem, generating an output based on the challenge and forwarding the response to the requesting entity via the controller.

In one embodiment, the set of parameters comprised in the request comprises the challenge. In one embodiment, the set of parameters comprised in the request comprises a first part of the challenge, and the method further comprises, at the controller, combining the first part of the challenge with a stored second part of the challenge to provide the challenge. In one embodiment, the set of parameters comprised in the request comprises an input to a challenge creation function which is used to create a challenge for the PUF. In one embodiment, the challenge creation function comprises a Lookup Table (LUT). In one embodiment, the challenge creation function comprises a One-way Function (OWF). In one embodiment, the challenge creation function comprises a Pseudo-Random Number Generator (PRNG).

In one embodiment, the method further comprises saving helper data utilized by the response generation subsystem to generate the output.

In one embodiment, determining whether the request is valid comprises checking whether the challenge is included in one of the plurality of challenge space subsets that is mapped to the requesting entity from which the request is received.

In one embodiment, at the response generation subsystem, generating the output comprises obtaining a response provided by the PUF responsive to the challenge and generating the output based on the response provided by the PUF responsive to the challenge. In one embodiment, generating the output based on the response provided by the PUF responsive to the challenge comprises performing an error correction on the response provided by the PUF to provide an error-corrected response and generating the output based on the error-corrected response. In one embodiment, generating the output based on the error-corrected response comprises applying a One-Way Function (OWF) or Key Derivation Function (KDF) to the error-corrected response to provide the output.

In one embodiment, the method further comprising saving helper data utilized by the response generation subsystem to generate the output, the helper data comprising an error correction code used to provide the error-corrected response.

In one embodiment, the set of parameters in the method further comprises a credential related to the requesting entity from which the request is received. In one embodiment, in order to determine whether the request is a valid request, the method further comprises checking whether the credential comprised in the request fulfills an authorization criterion at the secure hardware component. In one embodiment, the credential in the method comprises (a) a pre-defined token, (b) an identity of the requesting entity, (c) a state of the requesting entity, (d) a proof of possession of a secret, (e) a password, (f) a Personal Identification Number (PIN), (g) biometric input, (h) attributes related to the requesting entity or (i) a combination of any two or more of (a)-(h).

In one embodiment, at the response generation subsystem, generating the output comprises obtaining a response provided by the PUF responsive to the challenge and generating the output based on the response by the PUF responsive to the challenge and additional data using a transformation function.

In one embodiment, generating the output based on the response by the PUF responsive to the challenge and additional data using a transformation function comprises performing an error correction on the response by the PUF to provide an error-corrected response and generating the output based on the error-corrected response and the additional data using the transformation function. In one embodiment, the additional data in the method comprises: (a) a credential, (b) data stored on the secure hardware component, (c) data received from the requesting entity, (d) two or more of (a)-(c). In one embodiment, the transformation function comprises an OWF. In one embodiment, the transformation function comprises a KDF.

In one embodiment, the challenge corresponds to a selection of at least one element in the PUF to generate at least one response that is a result of the selection, and the output is based on the at least one response generated by the PUF as a result of the selection. In one embodiment, the challenge corresponds to a configuration of at least one element of the PUF, and the output is based on at least one response generated by the PUF as a result of the configuration. In one embodiment, a first response corresponding to at least one challenge from the challenge space of the PUF is disallowed from being generated. In one embodiment, the at least one challenge is removed from the plurality of challenge space subsets. In one embodiment, a first response corresponding to the at least one challenge is replaced with a second response.

BRIEF DESCRIPTION OF THE DRAWINGS

The accompanying drawing figures incorporated in and forming a part of this specification illustrate several aspects of the disclosure, and together with the description, serve to explain the principles of the disclosure. Optional features are represented by dashed boxes.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

A Physically Unclonable Function (PUF) has the potential to derive many keys for different entities. However, due to limited access control, most PUFs are either limited to a single entity or are free for everyone to use and, therefore, are not suitable for generating a cryptographic key.

Rijnswou only handles virtual environments. It limits each entity (virtual machine) to a single key which they do not control themselves but is used by an underlying layer to perform memory/disk encryption. Furthermore, there is no authentication of requesting entities.

Duplys uses a user-specified credential to unlock the PUF and discloses that the credential can be a biometric or an environmental condition. The solution of Duplys, however, assumes that the requester is a human. The solution of Duplys does not allow the output to be influenced by the requester, e.g., by selecting a challenge or combining the response with additional data. Furthermore, the solution of Duplys does not include mapping PUF challenge-response pair(s) to different requesting entities.

The reconfigurable PUF (for example, the PUF described in the IACR paper) can enforce a state on a PUF. However, the reconfigurable PUF does not provide predefined-challenge subsets, nor do they handle credentials from different entities trying to access the PUF.

Systems and methods are disclosed herein that enable PUF slicing. As used herein, PUF slicing refers to the use of a single PUF by multiple requesting entities, where each requesting entity has access to a different "slice" of the PUF. In one embodiment, each PUF slice corresponds to a different subset of a challenge space of the PUF. In another embodiment, each PUF slice corresponds to a different transformed set of challenge-response pairs for the PUF. In other words, a unique transformation is applied to the PUF response for each requesting entity. By using PUF slicing, each requesting entity can safely use the same PUF, e.g., to create several deterministic keys or identities or use the challenge-response mapping for authentication purposes. By dividing a PUF into several PUF slices, the systems and methods of the present disclosure enable a system where only a part of the PUF is exposed to each requesting entity. For this reason, a single PUF is allowed to produce keys/responses for several different entities without risking information leakage.

Figure 1:
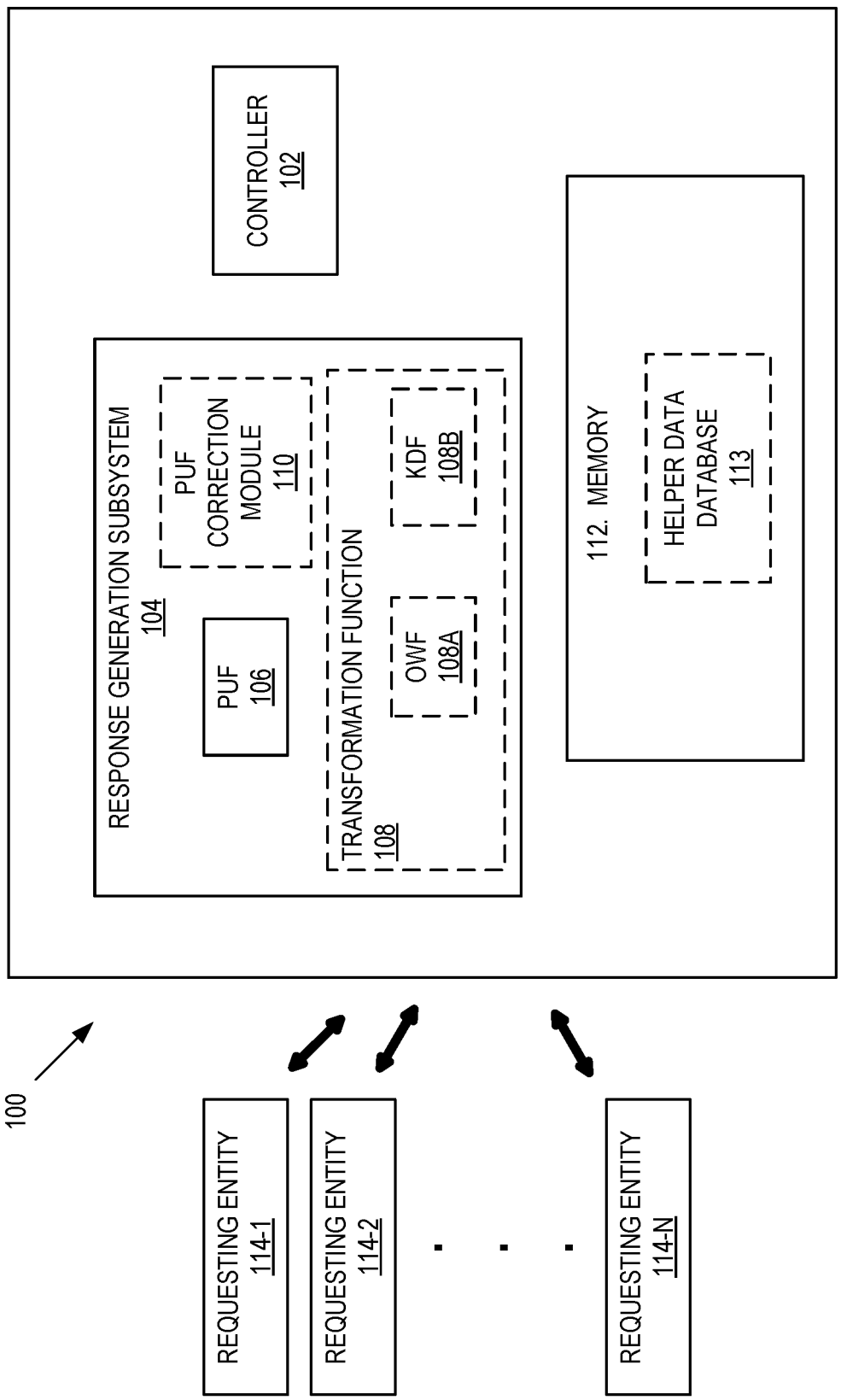
FIG. 1 is an example of a secure hardware component that implements embodiments of the present disclosure.

FIG. 1 illustrates a secure hardware component 100 that may implement the systems and methods of the present disclosure. The secure hardware component 100 is a hardware component (e.g., a Universal Serial Bus (USB) device or the like). The functionality of the secure hardware component 100 or its sub-components described herein may be implemented in hardware, implemented in software that is executed by a processor(s) (e.g., Central Processing Unit(s) (CPU(s)), Application Specific Integrated Circuit(s) (ASIC(s)), Field Programmable Gate Array(s) (FPGA(s)), and/or the like) within the secure hardware component 100, or implemented in a combination of hardware and software.

As illustrated, the secure hardware component 100 includes a controller 102 and a response generation subsystem 104. The response generation subsystem 104 includes a PUF 106 and optionally a transformation function 108 and/or a PUF correction module 110. Optionally, the response generation system 104 also includes a challenge creation function 109. Optionally, the challenge creation function 109 includes a One-Way Function (OWF) 109A, a Lookup Table (LUT) 109B, and/or a Pseudo-Random Number Generator (PRNG) 109C.

The transformation function 108 may include either or both of two optional functions: a One-Way Function (OWF) 108A and a Key Derivation Function (KDF) 108B. The secure hardware component 100 also includes a memory 112 or other storage mechanism, which in some embodiments is used to store helper data, e.g., in a helper data database 113. The secure hardware component 100 may exchange data with a plurality of clients, such as a number (N) of requesting entities 114-1 through 114-N, which are generally referred to herein as requesting entities 114. Note that optional sub-components of the secure hardware component 100 are represented in FIG. 1 by dashed boxes.

The various components of the secure hardware component 100 are as follows:

Response Generation Subsystem 104: The response generation subsystem 104 may include:

PUF 106: The PUF 106 receives a challenge and generates a device-unique response. The PUF 106 is preferably a PUF with a plurality of Challenge-Response Pairs (CRPs). The PUF 106 may be implemented on, e.g., a Field-Programmable Gate Array (FPGA) or in an Application Specific Integrated Circuit (ASIC). However, the PUF 106 is not limited to be implemented on an FPGA or an ASIC. The PUF 106 may be implemented in any suitable type of hardware or any suitable combination of hardware and software.

Transformation Function 108: The transformation function 108 may include a One-Way Function (OWF) 108A and/or a Key Derivation Function (KDF) 108B.

OWF 108A: The OWF 108A is a function that is easy to compute on every input but is hard to invert given the image of a random input. Examples of the OWF 108A are a Message Authentication Code (MAC) function and hash functions such as the Secure Hash Algorithm (SHA) families, e.g. SHA2 and SHA3, and BLAKE hash function families, e.g., BLAKE-256, BLAKE-224, BLAKE-512, and BLAKE-384.

KDF 108B: The KDF 108B creates a cryptographic key from the PUF response. Depending on the cryptographic algorithm, the KDF 108B may comprise different components. For a cryptographic algorithm accepting uniform randomness as a key, a One-Way Function (OWF) such as a hash function or a Message Authentication Code (MAC) could be used. In other cases, a more complex KDF function that creates a key satisfying a specific criterion of the cryptographic algorithm is needed. The KDF 108B may also use additional parameters, sometimes called a key context, when creating the cryptographic key. The additional parameters may comprise a number of bits, cryptographic algorithm, usage restrictions, identifier, etc. Examples of the KDF function are Argon2, Scrypt, and Password-Based Key Derivation Function 2 (PBKDF2).

Challenge Creation Function 109: The challenge creation function 109 may include an OWF 109A and a Lookup Table (LUT) 109B OWF 109A: The OWF 109A is a function that is easy to compute on every input but hard to invert given the image of a random input. Examples of the OWF 108A are a Message Authentication Code (MAC) function and hash functions such as the Secure Hash Algorithm (SHA) families, e.g. SHA2 and SHA3, and BLAKE hash function families, e.g., BLAKE-256, BLAKE-224, BLAKE-512, and BLAKE-384.

LUT 109B: The LUT 109B may be used, instead of the OWF 109A, to map inputs to valid challenges for the PUF.

PRNG 109C: The PRNG 109C may be used in lieu or in combination with the OWF 109A and the LUT 109B. The PRNG 109C uses the input as a seed and generates pseudo-random challenges of the desired length. For example, the PRNG 109C may comprise a Linear-Feedback Shift Register (LFSR) or a Marsenne Twister.

PUF Correction Module 110: The PUF correction module 110 applies error correction to recreate a PUF response, for example, by using helper data. The helper data may comprise error correcting codes, such as Bose-Chaudhuri-Hocquenghem (BCH) codes or Reed-Muller codes. The helper data may additionally comprise general knowledge of the PUF, such as unstable bits to remove from the response. For example, the PUF correction module 110 may be implemented (a) in software using a CPU, (b) in programmable logic on an FPGA, (c) as a pure hardware implementation, (d) as a combination of (a)-(c).

Controller 102: Examples of the controller 102 are Central Processing Units (CPUs), Application-Specific Integrated Circuits (ASICs), or Field Programmable Gate Arrays (FPGAS). In one embodiment, a challenge space of the PUF 106 is provided (i.e., a set of all possible challenges that can be input to the PUF 106 to obtain respective PUF responses in accordance with the device-unique CRPs of the PUF 106). In one embodiment, different PUF slices are provided by dividing the challenge space of the PUF 106 into multiple subsets (referred to herein as PUF challenge space subsets), where different allowed requesting entities 114 are mapped to different PUF challenge space subsets. In one embodiment, the controller 102 takes a credential (e.g., a password, an entity identification (ID), or state from the requesting entity 114) to determine what PUF challenge space subset is allowed to be accessed by that requesting entity 114. In another embodiment, the PUF slices correspond to different unique challenge-response mappings, e.g., by applying one or several requesting-entity-unique parameters (e.g., the credentials of the requesting entity 114) to the PUF responses to form a unique challenge-response mapping.

Memory 112: Examples of the memory 112 are non-volatile memory types such as One-Time Programmable (OTP) memory or integrity-protected Multiple-Time Programmable (MTP) memory. In one embodiment, the memory 112 stores a transformed authentication token for each requesting entity 114 that can be used to authenticate the requesting entity 114. In some embodiments, the memory 112 stores helper data associated with the creation of the output returned to the requesting entity 114 in response to a request. In some embodiments, the memory 112 stores credentials of the requesting entities 114, which can be used to authenticate requests from the requesting entities 114.

Helper data database 113: In one embodiment, the helper data database 113 is included in the memory 112. For example, the helper data database 113 stores entries of error-correcting codes or general knowledge of the PUF, such as knowledge of unstable bits to remove from the response, which helps to recreate PUF responses.

In one embodiment, the controller 102 divides the PUF challenge space into several mutually exclusive (i.e., disjoint) subsets, which are referred to herein as PUF challenge space subsets. Each PUF challenge space subset is assigned to at least one requesting entity 114, such as a hardware component, a virtual machine, a container, a computer program, or a device. A particular PUF challenge space subset may only be accessed by at least one requesting entity 114 (e.g., the requesting entity 114 having the appropriate credentials to access the particular PUF challenge space subset). The PUF challenge space subsets can be pre-defined, i.e., exposed as Application Programming Interfaces (APIs) or on-demand, where each request is associated with, for example, a state, a password, ID, or a token. In one embodiment, the controller 102 authenticates the credentials belonging to a requesting entity 114 prior to providing a PUF response. Thus, completely unauthorized attackers will not be able to gain any information regarding the PUF 106. Further, an authorized (but malicious) entity will gain information only on its own PUF challenge space subset.

If a requesting entity 114 is authorized to access a specific PUF challenge space subset, the decision is made by the controller 102 that controls the input to the PUF 106. For example, the credential used to identify a requesting entity 114, which may be an external device, may comprise a password, a hardware identification, a pre-distributed token, a state, or a unique identifier for the external device.

In one embodiment, post-processing of the PUF response, i.e., error correction and/or key derivation, may either be performed by the transformation function 108 (or alternatively by the controller 102) or by the requesting entity 114.

The present disclosure is directed to embodiments implemented by the secure hardware component 100, which has two operational modes: an enrollment mode and an operation mode. During the enrollment, the controller 102 sets up the mapping between the requesting entities 114 and their corresponding PUF challenge space subsets. The mapping between the requesting entities 114 and their corresponding PUF challenge space subsets may be implemented in any desired manner. For example, the mapping may be between credentials of the requesting entities 114 and the respective PUF challenge space subset. In one embodiment, the PUF challenge space subsets of the requesting entities 114 may each comprise at least one challenge for the PUF 106. A subset (comprising a plurality of challenges) may be a subset of challenges having a common prefix, suffix and/or infix from the challenge space of the PUF. Alternatively, the subset of challenges may comprise several distributed challenges within the challenge space of the PUF 106. In one embodiment, credentials of the requesting entities 114 are stored in the memory 112 and may be integrity-protected. Depending on what the credentials comprise, for example, a password, an identification (ID), or a state of an entity, each of the credentials may be stored in a transformed (e.g., hashed) form.

In the operation mode, the requesting entity 114 provides its credentials to the secure hardware component 100. If the PUF challenge space subset allocated for the requesting entity 114 permits one or more challenges, the requesting entity 114 also submits at least a part of a challenge to the secure hardware component 100. In some embodiments, the requesting entity 114 instead submits one or several parameters to the challenge creation function 109, which is used to create the challenge. In some embodiments, a proof of possession of a credential may be in the form of a challenge-response procedure where the controller 102 generates a challenge that the requesting entity 114 needs to respond to, i.e., a challenge-response authentication scheme, which is different from the PUF Challenge-Response Pairs (CRPs).

The controller 102 evaluates whether the credentials are valid by comparing them to the credentials stored in the memory 112 or by determining whether the credentials fulfill an authentication criterion. Given that the provided credential has been found to be valid, the next step is to evaluate if the challenge belongs to the PUF challenge space subset corresponding to the requesting entity X114 (e.g., corresponding to the presented credentials).

If the challenge is valid, the challenge is sent to the PUF 106, which produces a response. In one embodiment, if it is the first time a response is generated, the PUF correction module 110 generates and stores helper data to facilitate recreation at a later point in time.

Depending on a use case, the PUF response output by the PUF 106 in response to the provided challenge may be provided to the transformation function 108 (for example, the OWF 108A or the KDF 108B) to provide an output that is supplied to the requesting entity 114. For example, providing the PUF response to the OWF 108A may be used to break a correlation between the Challenge-Response Pairs (CRPs) with closely connected challenges.

The step of storing helper data may be outsourced to the requesting entity 114. In this case, error correction and/or key derivation is performed at the request entity. Such implementation also allows for the requesting entity 114 to use the PUF 106 for authentication with an external party. The response or cryptographic key is provided to the requesting entity 114.

Figure 2A:
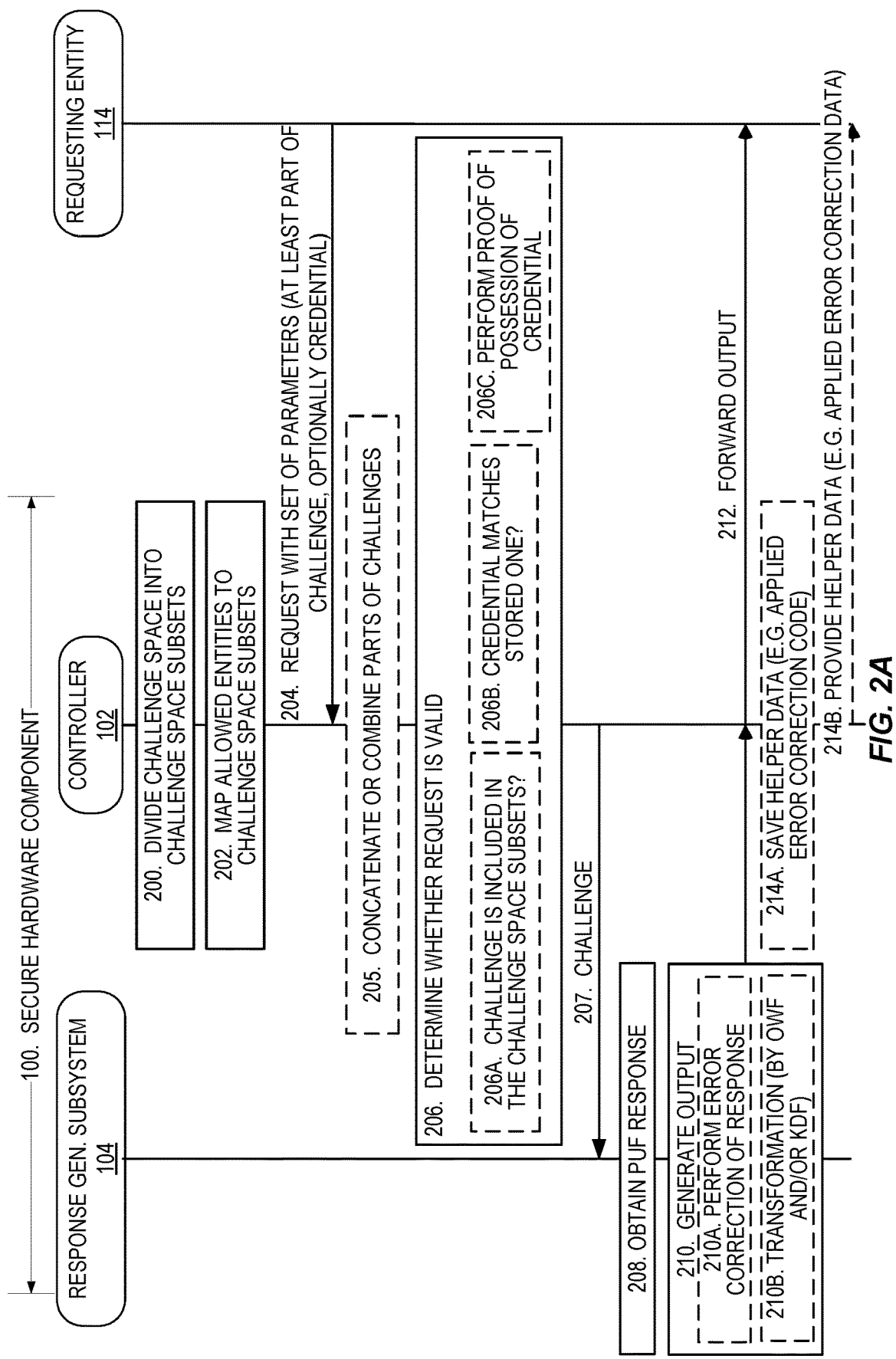
FIG. 2A is a flow diagram illustrating a method implemented in the secure hardware component connected to the requesting entity in accordance with some embodiments of the present disclosure.

FIG. 2A is a flow diagram illustrating a method implemented in the secure hardware component 100 in accordance with some embodiments of the present disclosure. Optional steps are represented by dashed lines/boxes. As illustrated in FIG. 1, the secure hardware component 100 comprises the controller 102 and the response generation subsystem 104. The operation is as follows:

Step 200: The controller 102 divides the challenge space of the PUF 106 into multiple PUF challenge space subsets.

Step 202: The controller 102 maps one or more allowed requesting entities 114 to one or more of the PUF challenge space subsets, respectively. For example, the mapping may be done via an enrollment procedure performed for each of multiple requesting entities 114. Step 200 and 202 may be continuously performed during the lifetime of the secure hardware component 100, e.g. when allowed requesting entities 114 are added or removed.

Step 203: The controller 102 receives a request for an output from a particular requesting entity 114. For example, the request may include a set of parameters, which may include a challenge from the respective PUF challenge space subset, at least a part of a challenge from the respective PUF challenge space subset, or one or several parameters used as input to the challenge creation function 109. Optionally, the set of parameters may further comprise a credential related to the particular requesting entity 114.

Step 204 (Optional): In one embodiment, where the request includes one or several parameters (e.g., an identifier, a credential, or a token) used as input to challenge creation function 109, the challenge creation function 109 transforms the at least one parameter into a valid challenge for the PUF 106.

Figure 6:
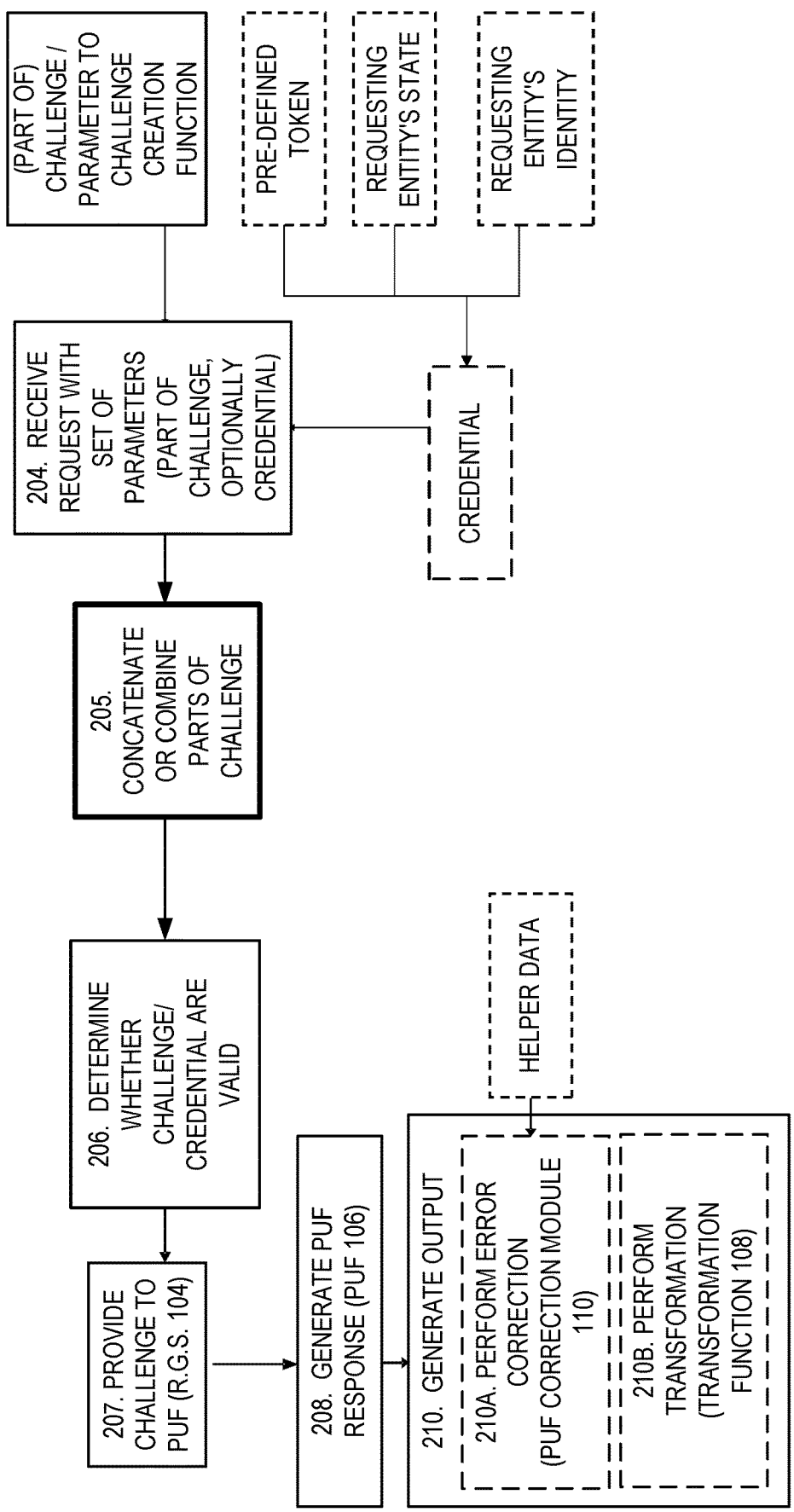
FIG. 6 is a flow diagram illustrating a method implemented in the secure hardware component for concatenating challenges in accordance with some embodiments of the present disclosure.

Step 205 (Optional): In one embodiment, the set of parameters includes only a first part of a challenge from the respective PUF challenge space. In this case, the controller 102 concatenates or combines the first part of the challenge received from the requesting entity 114 and a second part of the challenge that is either stored by or decided by the controller 102. In another embodiment, the challenge creation function 109 may instead transform at least one parameter in the set of parameters to a first part of the challenge (step 204). An example of the combining of two parts of a challenge is illustrated in FIG. 6.

Step 206: The controller 102 determines whether the request is a valid request based on the set of parameters. This determination may include one or more of the following:

Step 206A: The controller 102 may check whether the challenge is included in the PUF challenge space subset that is mapped to the requesting entity 114 from which the request is received. Note that, in one embodiment, the challenges in the challenge space of the PUF 106 correspond to selecting different elements in the PUF 106 to generate the PUF response and the respective PUF responses are the results of selecting the different elements in the PUF 106. In another embodiment, the challenges in the challenge space of the PUF 106 correspond to configuring different elements in the PUF 106 to generate the PUF response and the PUF response is a result of this configuration.

Step 206B (Optional): The controller 102 may check whether the credential comprised in the request fulfills an authentication criterion at the secure hardware component 100. For example, the credential may comprise: (a) a pre-defined token, (b) an identity of the requesting entity 114, (c) a state of the requesting entity 114, (d) a proof of possession of a secret, or (e) a combination of any two or more of (a)-(d).

Step 206C (Optional): The controller 102 may perform a procedure for proof of possession of the credential. The procedure for proof of possession of the credential may be in the form of a challenge-response procedure where the controller 102 generates a challenge that the requesting entity 114 needs to respond to, i.e., a challenge-response authentication scheme, which is different from the PUF CRPs. Through the process of the proof of possession of the credential, the controller 102 may authenticate that the request from the requesting entity 114 is valid.

Step 207: The controller 102 forwards the challenge to the response generation subsystem 104.

Step 208: The PUF 106 of the response generation subsystem 104 generates a response (i.e., a PUF response) based on the received challenge. Note that the manner in which the PUF 106 generates the PUF response depends on the implementation of the PUF 106. There are many well-known types of PUFs. Any type of PUF, preferably a PUF which has a plurality of challenges, may be used.

Step 210: The response generation subsystem 104 generates an output based on the PUF response. Details of step 210 are described below with respect to FIG. 2B. Note that, in one embodiment, the output is the PUF response. However, in other embodiments, one or more of the following steps may be performed to generate the output based on the PUF response.

Step 210A: In one embodiment, the PUF correction module 110 of the response generation subsystem 104 performs an error correction on the PUF response to provide an error-corrected response. In one embodiment, the error-corrected response is provided as the output.

Step 210B: In one embodiment, a transformation is applied to the PUF response or error-corrected PUF response, e.g., by the OWF 108A and/or the KDF 108B. Note that if a key derivation function is applied to the PUF response or the error-corrected PUF response by the KDF 108B, the output is a cryptographical key.

Step 212: The response generation subsystem 104 forwards the output to the requesting entity 114 via the controller 102. As discussed above, the output may include the PUF response, an error-corrected PUF response, or a transformed version of the PUF response.

Step 214A: Optionally, the controller 102 saves helper data utilized by the response generation subsystem 104 (e.g., error correction code applied in the step 210A described above) to generate the output provided to the requesting entity 114.

Step 214B: Optionally, the controller 102 may provide the helper data (e.g., error correction code applied in the step 210A described above) to the requesting entity 114.

Figure 2B:
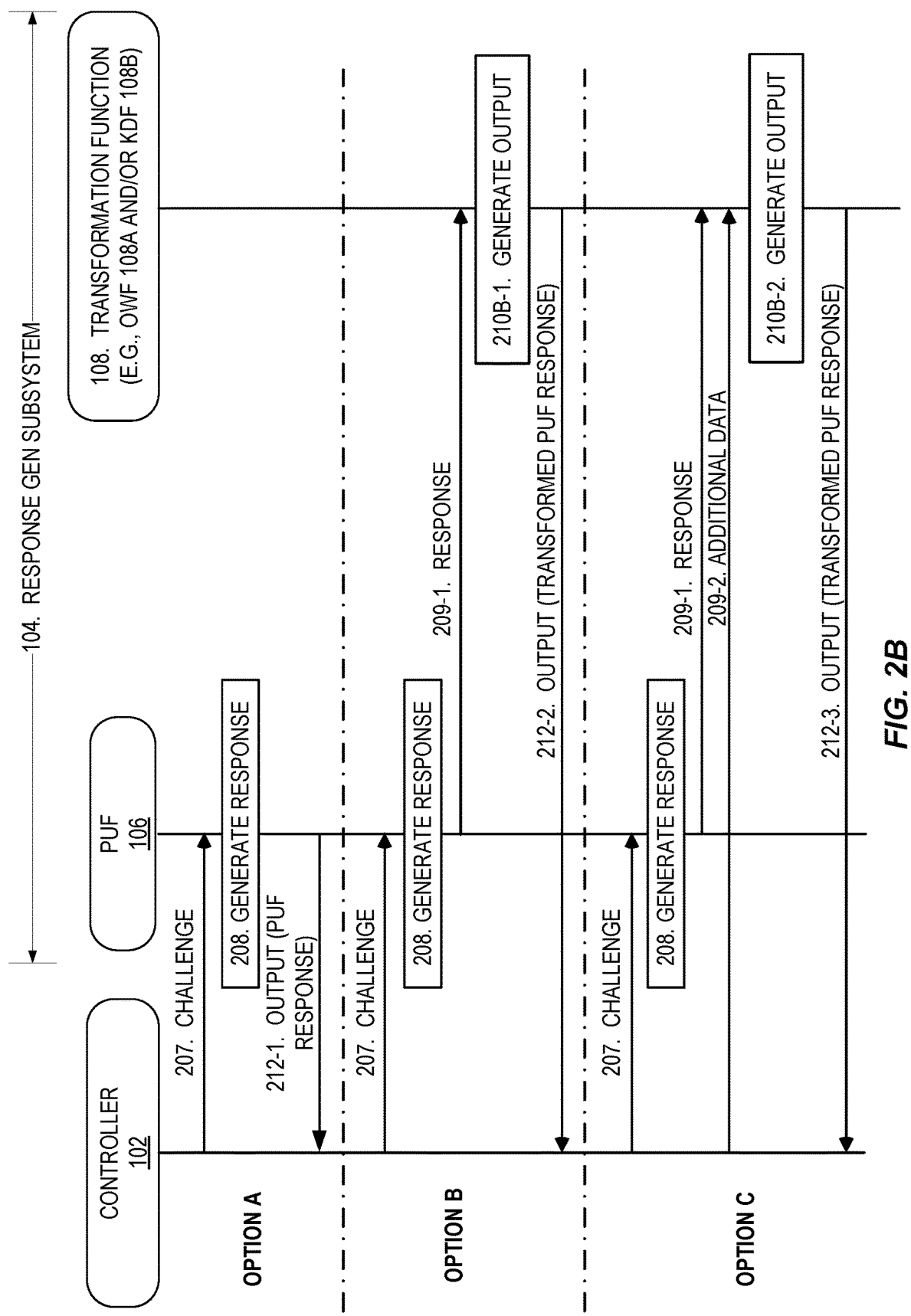
FIG. 2B is a flow diagram illustrating a method implemented in the response generation subsystem in accordance with some embodiments of the present disclosure.

FIG. 2B is a flow diagram illustrating the details of steps 207, 208, and 210 in accordance with several alternative embodiments (denoted here as Option A, Option B, and Option C). In one embodiment (Option A), upon receiving the challenge from the controller 102 in step 207, the PUF 106 provides the respective PUF response (step 208). Optionally, the response generation subsystem 104 (in particular the PUF correction module 110) may perform an error correction of the response (not shown). In this embodiment, the PUF response (or error-corrected PUF response) is returned to the controller 102 as the output to be provided to the requesting entity 114 (step 212-1).

In another embodiment (Option B), upon receiving the challenge from the controller 102 in step 207, the PUF 106 provides the respective PUF response (step 208). The PUF response (or error-corrected PUF response) is provided to the transformation function 108 (e.g., the OWF 108A and/or KDF 108B) (step 209-1). The transformation function 108 may generate the output by applying a transformation to the PUF response (step 210B-1) and provide the transformed PUF response to the controller 102 as the output to be provided to the requesting entity 114 (step 212-2).

In another embodiment (Option 3), upon receiving the challenge from the controller 102 in step 207, the PUF 106 provides the respective PUF response (step 208). The PUF response (or error-corrected PUF response) is provided to the transformation function 108 (e.g., the OWF 108A and/or KDF 108B) (step 209-1). The additional data is received from, for example, the controller 102 (step 209-2). The transformation function 108 (e.g., the OWF 108A and/or the KDF 108B) may generate the output by applying a transformation to the PUF response and the additional data (step 210B-2). The additional data may comprise (a) a credential of the requesting entity 114, (b) data stored on the secure hardware component 100, (c) data received from the requesting entity 114, or (d) two or more of (a)-(c). The transformation function 108 provides the transformed PUF response to the controller 102 as the output to be provided to the requesting entity 114 (step 212-3).

Figure 3:
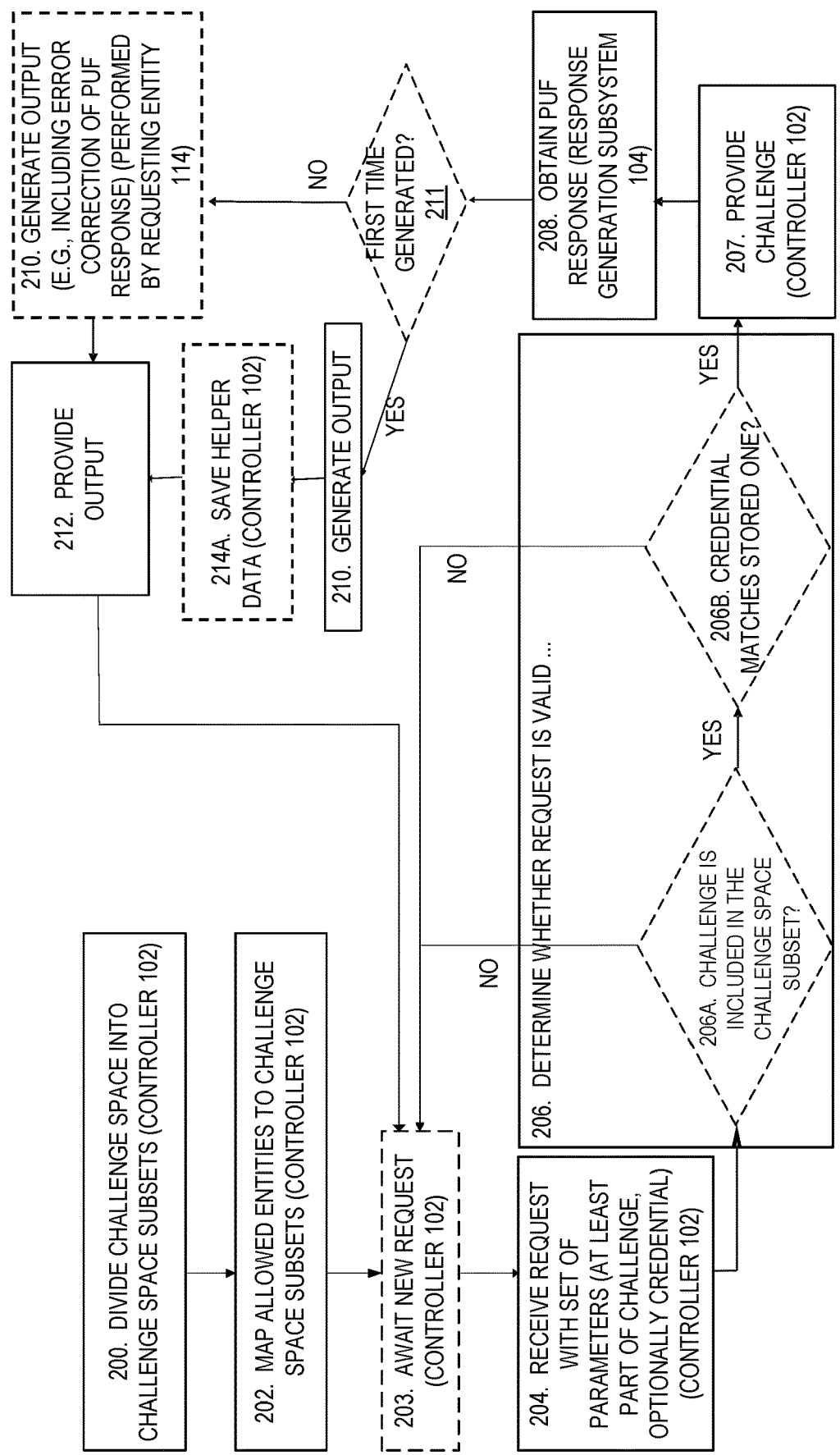
FIG. 3 is a flow diagram illustrating a method implemented in the secure hardware component in accordance with some embodiments of the present disclosure.

FIG. 3 is a flow diagram illustrating the operation of the secure hardware component 100 in accordance with one embodiment of the present disclosure. This process is similar to that of FIG. 2A and, as such, the same reference numbers for the steps are used where applicable. In the enrollment mode, the secure hardware component 100 (e.g., the controller 102) divides the PUF challenge space into several PUF challenge space subsets (step 200). The secure hardware component 100 (e.g., the controller 102) performs a mapping of one or more of the PUF challenge space subsets to one or more respective entities (e.g., one or more respective requesting entities 114) that are allowed to access the PUF 106 (step 202). Each entity is identified with a credential such as an Identification (ID), a token, a password, or a combination of such elements. These steps may be continuously performed during the lifetime of the secure hardware component 100, e.g., when allowed requesting entities 114 are added or removed.

In the operation mode, the secure hardware component 100 (e.g., the controller 102) waits for a new request (step 203). While waiting (monitoring) for a new request, the secure hardware component 100 (e.g., the controller 102) receives a request from a requesting entity 114.

The received request may include either a challenge or at least a part of a challenge, optionally a credential of the requesting entity 114 (step 203). Optionally, the received request may include one or several parameters used as an input to the challenge creation function 109 to be transformed into a valid challenge (step 204).

The secure hardware component 100 (e.g., the controller 102) evaluates whether the received request is valid (step 206). More specifically, in one embodiment, the secure hardware component 100 (e.g., the controller 102) determines whether the challenge is included in the PUF challenge space subset mapped to the requesting entity 114 (step 206A). The challenge may be included in the request. The challenge may be derived by combining (a) a part of the challenge which is (i) included in the request or (ii) generated by the challenge creation function 109 using one or several parameters from the request as an input (step 204) with (b) another part of the challenge which is decided or otherwise obtained by the controller 102.

The secure hardware component 100 (e.g., the controller 102) may also evaluate the credential included in the request against a stored credential of the requesting entity 114 to determine if the requesting entity 114 is approved to receive a response from the secure hardware component 100 (step 206B). Note that step 206B may first be performed to determine whether the received credentials match those of any of the allowed requesting entities 114. If there is a match, then the secure hardware component 100 (e.g., the controller 102) may determine whether the challenge is from the PUF challenge space subset of the matching requesting entity 114.

If the request is invalid, the operation is aborted. Otherwise, if the request is valid, the secure hardware component 100 (e.g., the controller 102) provides the challenge to the PUF 106 (step 207). The PUF 106 generates a PUF response based on the challenge, as described above (steps 208).

In one embodiment, if the operation is the first time of generating the output (step 211; YES), the secure hardware component 100 (e.g., the controller 102) generates the output (step 210) and saves helper data associated with the output (step 214A). If the operation is not the first time of generating the output (step 211; NO), the secure hardware component 100 (e.g., the controller 102) generates the output (210), which may include performing error correction, as described above. Then, the output is provided to the requesting entity 114 (step 212).

Figure 4:
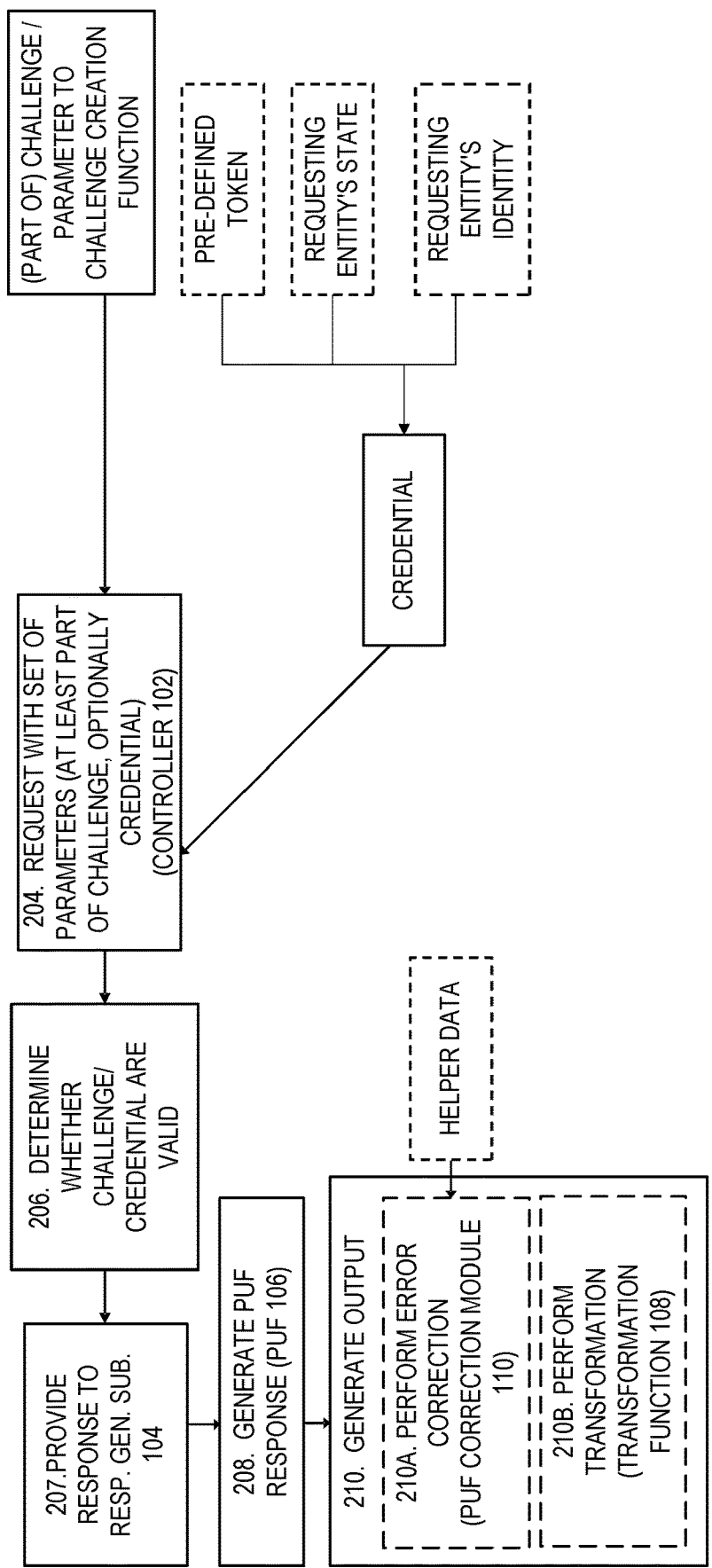
FIG. 4 is a flow diagram of a method implemented in the secure hardware component for the error correction of the response in accordance with some embodiments of the present disclosure.

FIG. 4 illustrates the operation of the secure hardware component 100 in accordance with some embodiments of the present disclosure. The operation illustrated in FIG. 4 is similar to that shown in FIGS. 2A and 2B as described above. As illustrated, the controller 102 receives a challenge and, optionally a credential, from the requesting entity 114 (step 203). Examples of the credential are a pre-defined token, requesting entity's state, and requesting entity's identity. The controller 102 then determines whether the challenge and the credential are valid (step 206). The controller 102 provides the challenge to the response generation subsystem 104 and, in particular, to the PUF 106 (step 207). The PUF 106 generates a PUF response based on the received challenge (step 208). The response generation subsystem 104 generates the output based on the PUF response, as described above (step 210). Optionally, the PUF correction module 110 of the response generation subsystem 104 may perform an error correction on the PUF response generated by the PUF 106 to provide an error-corrected response (step 210A). Optionally, the transformation function 108 (in particular the OWF 108A and/or KDF 108B) may transform the PUF response (or error-corrected PUF response) to generate the output (step 210B).

Figure 5:
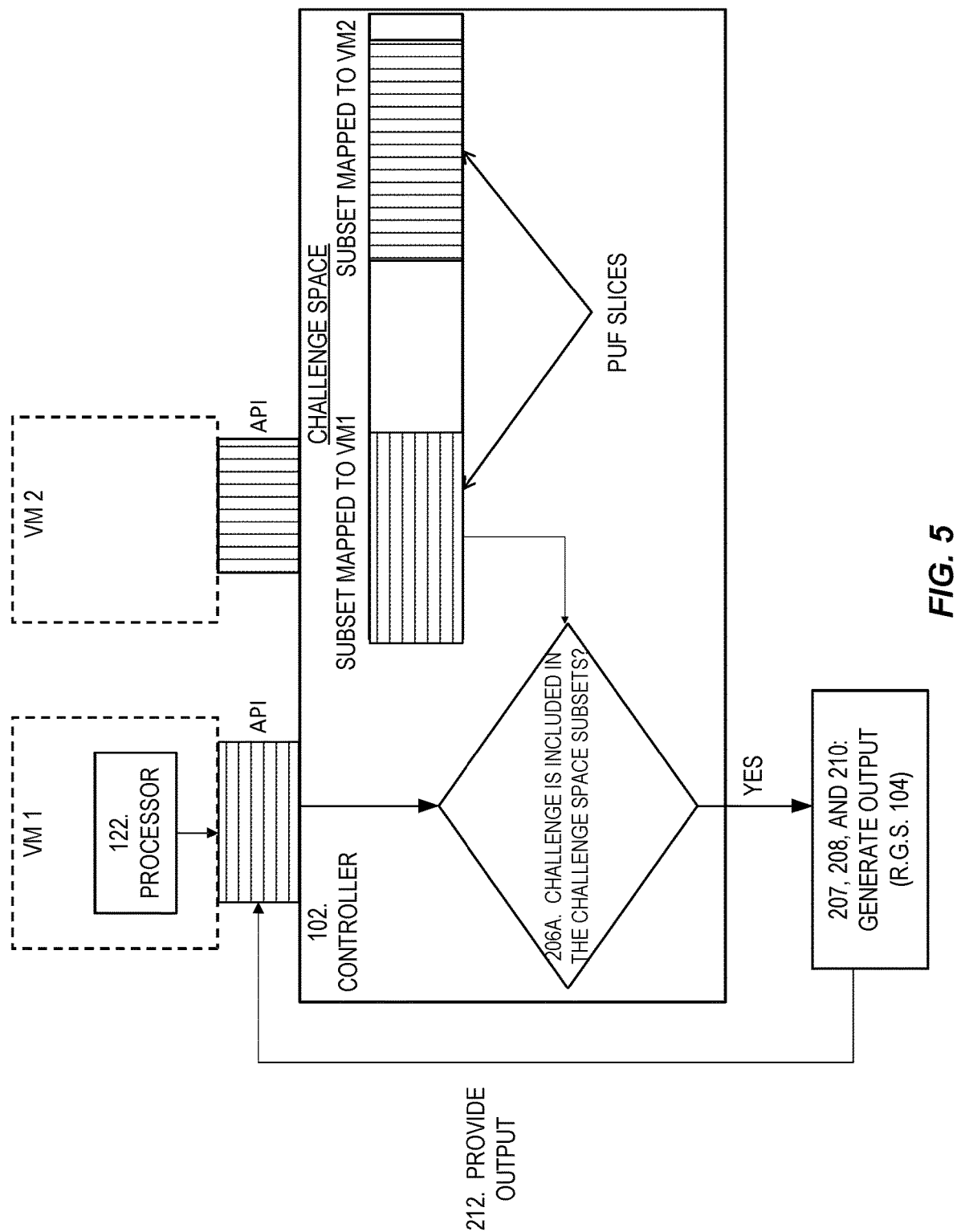
FIG. 5 is a flow diagram illustrating a method implemented in the secure hardware component coupled with pre-defined Application Programming Interfaces (APIs) in accordance with some embodiments of the present disclosure.

FIG. 5 is a flow diagram illustrating the operation of the secure hardware component 100 in accordance with another embodiment of the present disclosure. In the embodiment, the secure hardware component 100 is communicatively coupled to the requesting entities 114, which in this example are virtual machines (VMs) using pre-defined Application Programming Interfaces (APIs). An entity such as an operating system, hypervisor, or orchestration system sets up an API with a unique backend, exposing a specific PUF challenge space subset. The backends of the API are responsible to exclusively expose a PUF challenge space subset to a certain hardware component, virtual machine, container, a computer program (i.e., to a certain requesting entity 114). In one embodiment, no credentials need to be submitted when accessing these APIs as the operating system, the hypervisor, or the orchestration system handles access control to the APIs. The API may take a PUF challenge as input.

As illustrated in FIG. 5, the processor 122 of the virtual machine VM1 in the requesting entity 114 provides a request with a challenge (illustrated as a box with horizontal lines) to the secure hardware component 100. Then, the controller 102 of the secure hardware component 100 determines whether the challenge is included in the PUF challenge space subset mapped to the API over which the request was received (step 206A). When the controller 102 determines that the challenge is included in the PUF challenge space subset mapped to that API, the response generation subsystem 104 generates an output based on the received challenge (steps 207, 208, and 210) and provides the output to the requesting entity 114 (step 212).

FIG. 6 illustrates a variation of the procedure illustrated in FIG. 4. However, in this embodiment, the request includes only a part of the challenge. Then, in step 205 (marked as the bold-lined box), the controller 102 concatenates or combines the part of the challenge included in the request with another part of the challenge determined by the controller 102 to provide the challenge. That is, the challenge includes two parts, one part included in the request received from the requesting entity 114 and another part decided by the controller 102. The part decided by the controller 102 may be either (a) a prefix, (b) a suffix, (c) an infix, or (d) a combination of two or more of (a)-(c) in the requesting entity's challenge. Otherwise, the process of FIG. 6 is the same as that described above for FIG. 4.

Figure 7A:
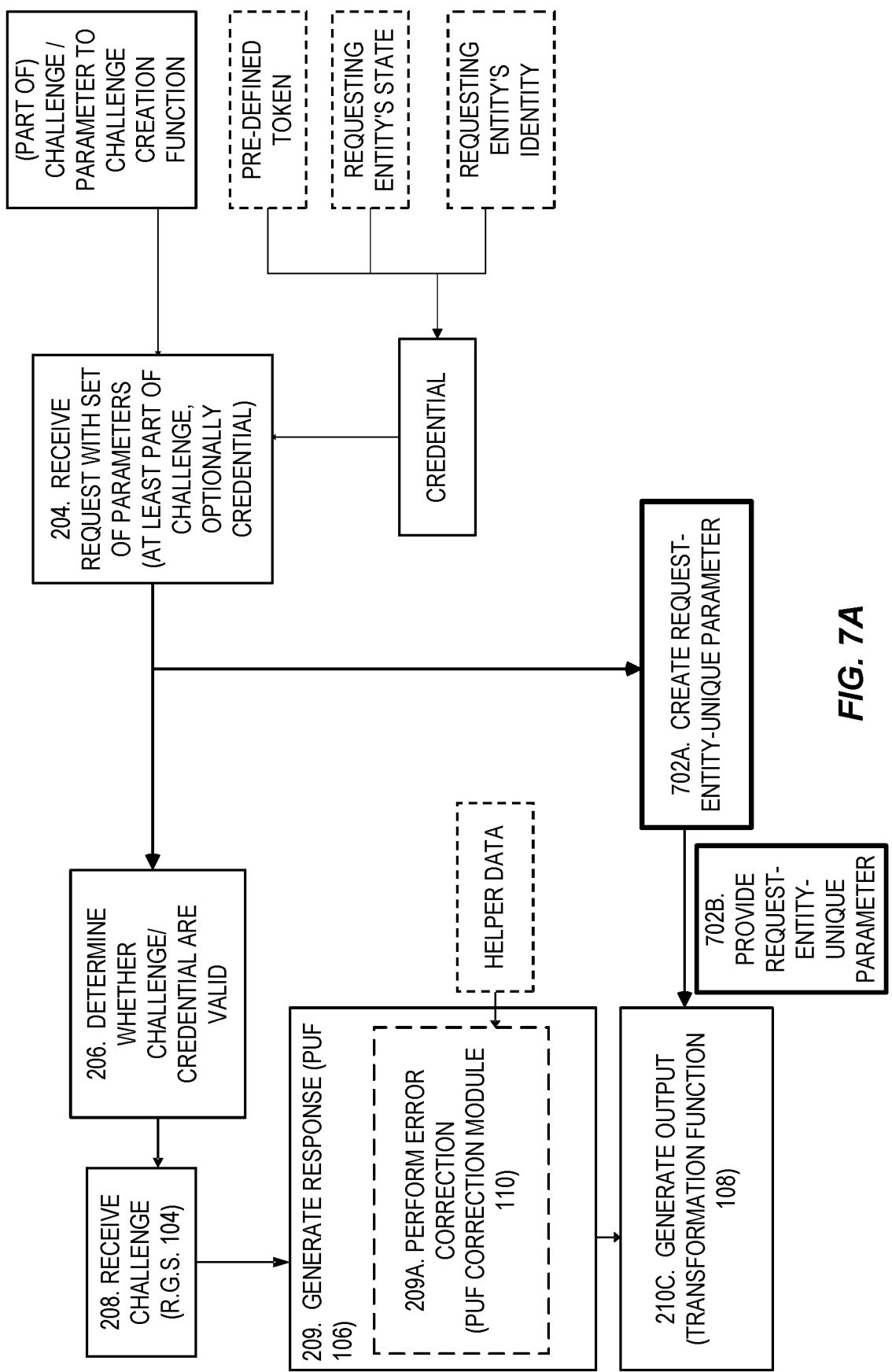
FIG. 7A is a flow diagram illustrating a method implemented in the secure hardware component using requestingentity-specific parameters in accordance with some embodiments of the present disclosure.

FIG. 7A illustrates an embodiment in which the PUF slices correspond to requesting-entity-unique challenge-response mappings, in addition to different PUF challenge space subsets. In this example, two or more requesting entities 114 have access to the same challenge space subsets of the PUF 106, and the requesting-entity-unique challenge-response mappings are provided by applying unique transformations to PUF responses output by the PUF 106 for the different requesting entities 114. In one embodiment, the unique transformations are based on the credentials of the requesting entities 114.

More specifically, in the example of FIG. 7A, the credentials of the requesting entity 114 are used to create a unique parameter for the transformation function 108 that is transforming the PUF response (step 702A). Steps 702A and 702B (marked as the bold-lined boxes) are unique to the embodiment illustrated in FIG. 7A.

Figure 7B:
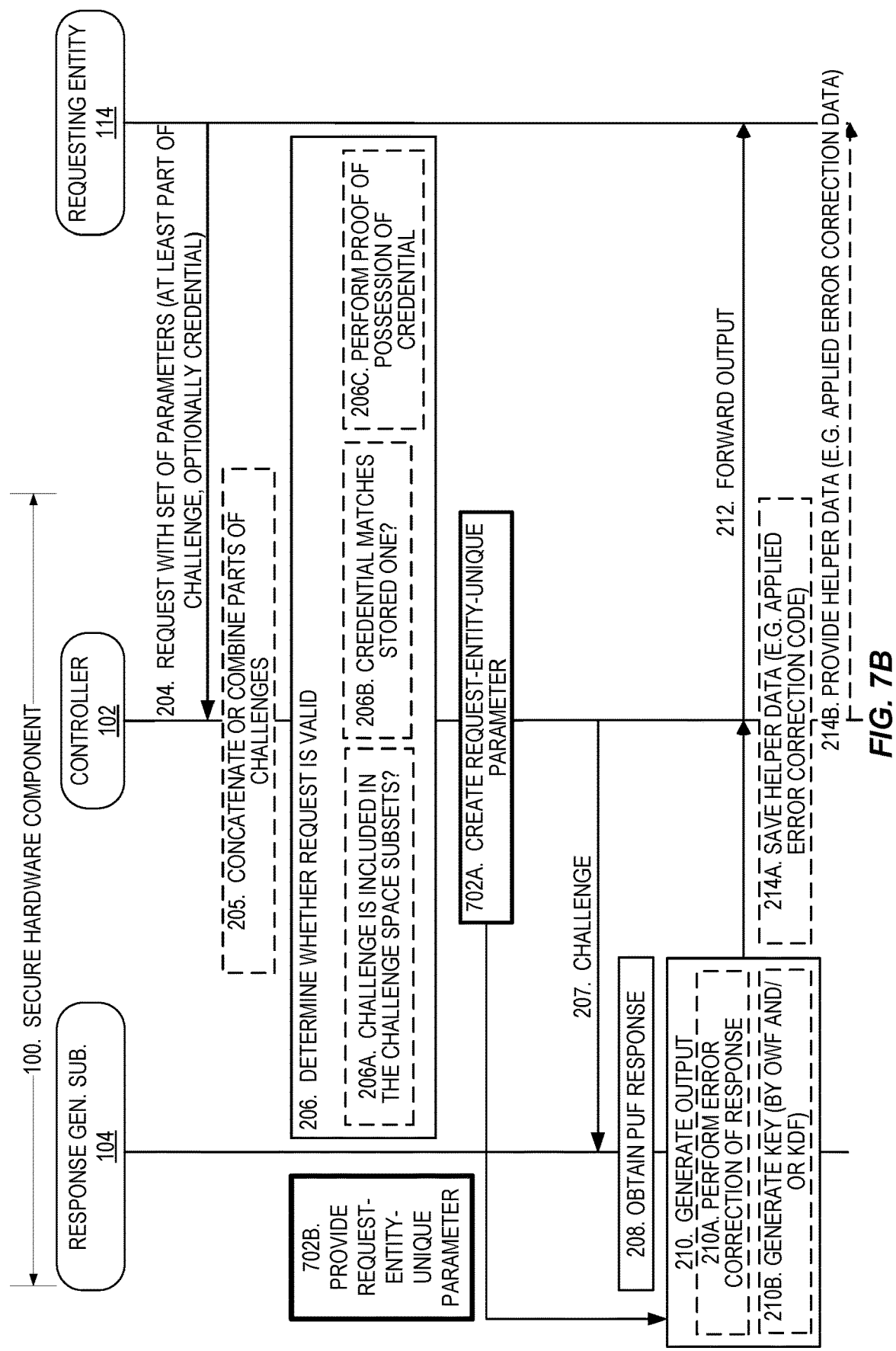
FIG. 7B is a flow diagram illustrating the method illustrated in FIG. 7A.

FIG. 7B illustrates a flow diagram of the embodiment illustrated in FIG. 7A. This flow diagram is similar to that of FIG. 2A and, as such, the same reference numbers are used where appropriate. As illustrated, after receiving the credential from the requesting entity 114 (step 203), the controller 102 creates a requesting-entity-unique parameter based on the credential (step 702A) and provides the requesting-entity-unique parameter to the transformation function 108 (step 702B). Then, the transformation function 108 utilizes the requesting-entity-unique parameter to transform the PUF response (or error-corrected PUF response) to generate the output for the requesting entity 114 (step 210).

For someone who possesses the credentials, how those credentials influence the output of the response generation subsystem 104 is preferably not predictable. The solution is to supply the requesting-entity-unique parameter and the PUF response to the transformation function 108, making it very difficult for the requesting entity 114 to reverse engineer the PUF response or output by knowing the requesting-entity-unique parameter. The requesting-entity-unique parameter creates an entity-unique mapping between the challenge and the transformed PUF response (and thus the output). Note that the CRP mapping of the PUF 106 stays the same since the credentials are supplied after the PUF response has been generated.

A PUF response corresponding to a challenge may be disallowed from being generated; thus, the PUF response corresponding to a challenge may be changed or replaced with another response, for example, by using a reconfigurable PUF or an erasable PUF. A challenge may be removed from the plurality of challenge space subsets.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is any inconsistency between abbreviations, preference should be given to how it is used above. If listed multiple times below, the first listing should be preferred over any subsequent listing(s).

API Application Programming Interface
ASIC Application-Specific Integrated Circuit
BBRAM Battery Backup Random Access Memory
BCH Bose-Chaudhuri-Hocquenghem
CPU Central Processing Unit
CRP Challenge-Response Pair
FPGA Field-Programmable Gate Array
IC Integrated Circuit
ID Identification
KDF Key Derivation Function
KEK Key Encryption Key
LFSR Linear-Feedback Shift Register
LUT Lookup Table
MAC Message Authentication Code
MTP Multiple-Time Programmable memory
NVM Non-Volatile Memory
OTP One-Time Programmable memory
OWF One-Way Function
PBKDF2 Password-Based Key Derivation Function 2
PRNG Pseudo-Random Number Generator
PUF Physically Unclonable Functions
RTL Register-Transfer Level
SHA Secure Hash Algorithm
SIM Subscriber Identity Module
USB Universal Serial Bus
VM Virtual Machine Those skilled in the art will recognize improvements and modifications to the embodiments of the present disclosure. All such improvements and modifications are considered within the scope of the concepts disclosed herein.

The invention claimed is:

1. A secure hardware component comprising:
a controller configured to exchange data with a requesting entity; and
a response generation subsystem coupled to the controller, the response generation subsystem comprising a Physically Unclonable Function, PUF;
wherein the controller is configured to:
divide a challenge space of the PUF into a plurality of challenge space subsets;
map one or more allowed requesting entities to one or more of the plurality of challenge space subsets, respectively;
receive a request for an output from a requesting entity from among the one or more allowed requesting entities, the request comprising a set of parameters;
determine whether the request is a valid request based on the set of parameters; and
forward the challenge to the response generation subsystem responsive to determining that the request is a valid request;
wherein the response generation subsystem is configured to generate an output based on the challenge and forward the output to the requesting entity via the controller.

2. The secure hardware component of claim 1, wherein the set of parameters comprised in the request comprises the challenge.

3. The secure hardware component of claim 1, wherein the set of parameters comprised in the request comprises a first part of the challenge, and the controller is further configured to combine the first part of the challenge with a stored second part of the challenge to provide the challenge.

4. The secure hardware component of claim 1, wherein response generation subsystem further comprises a challenge creation function and the challenge comprises the output of the challenge creation function.

5. The secure hardware component of claim 4, wherein at least one parameter in the set of parameters comprised in the request comprises an input to the challenge creation function.

6. The secure hardware component of claim 4 wherein the challenge creation function comprises a One-Way Function, OWF.

7. The secure hardware component of claim 4 wherein the challenge creation function comprises a Lookup Table, LUT.

8. The secure hardware component of claim 4 wherein the challenge creation function comprises a deterministic Pseudo-Random Number Generator, PRNG.

9. The secure hardware component of claim 1, wherein the controller is configured to save helper data utilized by the response generation subsystem to generate the output.

10. The secure hardware component of claim 1 wherein, in order to determine whether the request is a valid request, the controller is further configured to check whether the challenge is included in one of the plurality of challenge space subsets that is mapped to the requesting entity from which the request is received.

11. The secure hardware component of claim 1, wherein, in order to generate the output, the response generation subsystem is configured to:
receive the challenge from the controller;
obtain a response provided by the PUF responsive to the challenge; and
generate the output based on the response provided by the PUF responsive to the challenge.

12. The secure hardware component of claim 11 wherein, in order to generate the output based on the response provided by the PUF responsive to the challenge, the response generation subsystem is further configured to:
perform an error correction on the response provided by the PUF to provide an error-corrected response; and
generate the output based on the error-corrected response.

13. The secure hardware component of claim 12 wherein, in order to generate the output based on the error-corrected response, the response generation subsystem is further configured to apply a One-Way Function, OWF, or Key Derivation Function, KDF, to the error-corrected response to provide the output.

14. The secure hardware component of claim 12, wherein the controller is configured to save helper data utilized by the response generation subsystem to generate the output, the helper data comprising an error correction code used to provide the error-corrected response.

15. The secure hardware component of claim 11 wherein, in order to generate the output based on the response provided by the PUF responsive to the challenge, the response generation subsystem is further configured to apply a One-Way Function, OWF, or Key Derivation Function, KDF, to the response provided by the PUF to provide the output.

16. A method implemented in a secure hardware component including a controller configured to exchange data with a requesting entity, and a response generation subsystem coupled to the controller, the response generation subsystem comprising a Physically Unclonable Function, PUF, the method comprising:
- at the controller,
  - dividing a challenge space of the PUF into a plurality of challenge space subsets;
  - mapping one or more allowed requesting entities to one or more of the plurality of challenge space subsets, respectively;
  - receiving a request for an output from the requesting entity among the one or more allowed requesting entities, the request comprising a set of parameters;
  - determining whether the request is a valid request based on the set of parameters; and
  - forwarding the challenge to the response generation subsystem responsive to determining that the request is a valid request;
- at the response generation subsystem,
  - generating an output based on the challenge and forwarding the output to the requesting entity via the controller.

17. The method of claim 16 wherein the set of parameters comprised in the request comprises the challenge.

18. The method of claim 16 wherein the set of parameters comprised in the request comprises a first part of the challenge, and the method further comprises, at the controller, combining the first part of the challenge with a stored second part of the challenge to provide the challenge.

19. The method of claim 16 wherein response generation subsystem further comprises a challenge creation function and the challenge comprises the output of the challenge creation function.

20. The method of claim 19 wherein at least one parameter in the set of parameters comprised in the request comprises an input to the challenge creation function.

21. The method of claim 19 wherein the challenge creation function comprises a One-Way Function, OWF.

22. The method of claim 19 wherein the challenge creation function comprises a Lookup Table, LUT.

23. The method of claim 19 wherein the challenge creation function comprises a deterministic Pseudo-Random Number Generator, PRNG.

24. The method of claim 16 further comprising saving helper data utilized by the response generation subsystem to generate the output.

25. The method of claim 16 wherein determining whether the request is a valid comprises checking whether the challenge is included in one of the plurality of challenge space subsets that is mapped to the requesting entity from which the request is received.

26. The method of claim 16 wherein, at the response generation subsystem, generating the output comprises:
- obtaining a response provided by the PUF responsive to the challenge; and
- generating the output based on the response provided by the PUF responsive to the challenge.

27. The method of claim 26 wherein generating the output based on the response provided by the PUF responsive to the challenge comprises:
- performing an error correction on the response provided by the PUF to provide an error-corrected response; and
- generating the output based on the error-corrected response.

28. The method of claim 27 wherein generating the output based on the error-corrected response comprises applying a One-Way Function, OWF, or Key Derivation Function, KDF, to the error-corrected response to provide the output.

29. The method of claim 27 further comprising saving helper data utilized by the response generation subsystem to generate the output, the helper data comprising an error correction code used to provide the error-corrected response.

30. The method of claim 26 wherein generating the output based on the response provided by the PUF responsive to the challenge comprises applying a One-Way Function, OWF, or Key Derivation Function, KDF, to the response provided by the PUF to provide the output.

31. The method of claim 16, wherein the set of parameters further comprises a credential related to the requesting entity from which the request is received.

32. The method of claim 31 wherein determining whether the request is a valid comprises checking whether the credential comprised in the request fulfills an authentication criterion at the secure hardware component.

* * * * *